United States Patent [19]

Shebanow et al.

[11] Patent Number: 5,675,759
[45] Date of Patent: Oct. 7, 1997

[54] METHOD AND APPARATUS FOR REGISTER MANAGEMENT USING ISSUE SEQUENCE PRIOR PHYSICAL REGISTER AND REGISTER ASSOCIATION VALIDITY INFORMATION

[76] Inventors: Michael C. Shebanow, 1920 Glenwick Dr., Plano, Tex. 75075; Gene W. Shen, 181A Central Ave., Mountain View, Calif. 94043; Ravi Swami, 3945 Hamilton Park Dr., San Jose, Calif. 95130; Niteen A. Patkar, 160 Carlisle Way, Sunnyvale, Calif. 94087

[21] Appl. No.: 522,567

[22] Filed: Sep. 1, 1995

(Under 37 CFR 1.47)

Related U.S. Application Data

[63] Continuation of Ser. No. 397,893, Mar. 3, 1995, abandoned.
[51] Int. Cl.[6] .................................................. G06F 9/38
[52] U.S. Cl. ........................... 395/393; 395/392; 395/591
[58] Field of Search ................................. 395/375, 775, 395/800, 392, 393, 394, 591

[56] References Cited

U.S. PATENT DOCUMENTS

| | | | |
|---|---|---|---|
| 4,901,233 | 2/1990 | Liptay | 395/491 |
| 4,992,938 | 2/1991 | Cocke et al. | 395/393 |
| 5,197,132 | 3/1993 | Steely, Jr. et al. | 395/393 |
| 5,481,683 | 1/1996 | Karim | 395/393 |
| 5,493,669 | 2/1996 | Denman, Jr. | 395/460 |
| 5,499,352 | 3/1996 | Clift et al. | 395/393 |
| 5,524,262 | 6/1996 | Colwell et al. | 395/800 |

*Primary Examiner*—Parshotam S. Lall
*Assistant Examiner*—Viet Vu
*Attorney, Agent, or Firm*—Fenwick & West LLP

[57] ABSTRACT

In a microprocessor, an apparatus is included for coordinating the use of physical registers in the microprocessor. Upon receiving an instruction, the coordination apparatus extracts source and destination logical registers from the instruction. For the destination logical register, the apparatus assigns a physical address to correspond to the logical register. In so doing, the apparatus stores the former relationship between the logical register and another physical register. Storing this former relationship allows the apparatus to backstep to a particular instruction when an execution exception is encountered. Also, the apparatus checks the instruction to determine whether it is a speculative branch instruction. If so, then the apparatus creates a checkpoint by storing selected state information. This checkpoint provides a reference point to which the processor may later backup if it is determined that a speculated branch was incorrectly predicted. Overall, the apparatus coordinates the use of physical registers in the processor in such a way that: (1) logical/physical register relationships are easily changeable; and (2) backup and backstep procedures are accommodated.

11 Claims, 7 Drawing Sheets

METHOD AND APPARATUS FOR REGISTER MANAGEMENT USING ISSUE SEQUENCE PRIOR PHYSICAL REGISTER AND REGISTER ASSOCIATION VALIDITY INFORMATION

This application is a continuation of U.S. patent application Ser. No. 08/397,893 filed Mar. 3, 1995, having the same title and inventors as the present application, now abandoned.

Application Ser. No. 08/397,893 is a continuation-in-part patent application of U.S. patent application entitled "Method and Apparatus for Coordinating the Use of Physical Registers in a Microprocessor", filed Feb. 14, 1995.

RELATED APPLICATIONS

The subject matter of this application is related to the subject matter of the following applications:

application Ser. No. 08/388,602 entitled "INSTRUCTION FLOW CONTROL CIRCUIT FOR SUPERSCALER MICROPROCESSOR" filed on Feb. 14, 1995 by Takeshi Kitahara;

application Ser. No. 08/388,389 entitled "ADDRESSING METHOD FOR EXECUTING LOAD INSTRUCTIONS OUT OF ORDER WITH RESPECT TO STORE INSTRUCTIONS" filed on Feb. 14, 1995 by Michael A. Simone and Michael C. Shebanow;

application Ser. No. 08/388,606 entitled "METHOD AND APPARATUS FOR EFFICIENTLY WRITING RESULTS TO RENAMED REGISTERS" filed on Feb. 14, 1995 by DeForest W. Tovey, Michael C. Shebanow and John Gmuender;

application Ser. No. 08/390,885 entitled "METHOD AND APPARATUS FOR COORDINATING THE USE OF PHYSICAL REGISTERS IN A MICROPROCESSOR" filed on Feb. 14, 1995 by DeForest W. Tovey, Michael C. Shebanow and John Gmuender;

application Ser. No. 08/390,885 entitled "PROCESSOR STRUCTURE AND METHOD FOR TRACKING INSTRUCTION STATUS TO MAINTAIN PRECISE STATE" filed on Feb. 14, 1995 by Gene W. Shen, John Szeto, Niteen A. Patkar and Michael C. Shebanow;

application Ser. No. 08/397,891 entitled "METHOD AND APPARATUS FOR SELECTING INSTRUCTIONS FROM ONES READY TO EXECUTE" filed on Mar. 3, 1995 by Michael C. Shebanow, John Gmuender, Michael A. Simone, John R. F. S. Szeto, Takumi Maruyama and DeForest W. Tovey;

application Ser. No. 08/397,911 entitled "HARDWARE SUPPORT FOR FAST SOFTWARE EMULATION OF UNIMPLEMENTED INSTRUCTIONS" filed on Mar. 3, 1995 by Shalesh Thusoo, Farnad Sajjadian, Jaspal Kohli, and Niteen Patkar;

application Ser. No. 08/398,284 entitled "METHOD AND APPARATUS FOR ACCELERATING CONTROL TRANSFER RETURNS" filed on Mar. 3, 1995 by Akiro Katsuno, Sunil Savkar and Michael C. Shebanow;

application Ser. No. 08/398,066 entitled "METHODS FOR UPDATING FETCH PROGRAM COUNTER" filed on Mar. 3, 1995 by Akira Katsuno, Niteen A. Patkar, Sunil Savkar and Michael C. Shebanow;

application Ser. No. 08/398,151 entitled "METHOD AND APPARATUS FOR RAPID EXECUTION OF CONTROL TRANSFER INSTRUCTIONS" filed on Mar. 3, 1995 by Sunil Savkar;

application Ser. No. 08/397,910 entitled "METHOD AND APPARATUS FOR PRIORITIZING AND HANDLING ERRORS IN A COMPUTER SYSTEM" filed on Mar. 3, 1995 by Chih-Wei David Chang, Joel Fredrick Boney and Jaspal Kohli;

application Ser. No. 08/397,800 entitled "METHOD AND APPARATUS FOR GENERATING A ZERO BIT STATUS FLAG IN A MICROPROCESSOR" filed on Mar. 3, 1995 by Michael Simone; and application Ser. No. 08/397,912 entitled "ECC PROTECTED MEMORY ORGANIZATION WITH PIPELINED READ-MODIFY-WRITE ACCESS" filed on Mar. 3, 1995 by Chien Chen and Yizhi Lu; each of the above applications having the same assignee as the present invention, and each incorporated herein by reference in their entirety.

FIELD OF THE INVENTION

This invention relates generally to microprocessors, and more particularly to a method and apparatus for efficiently coordinating the use of physical registers in a microprocessor during instruction execution.

BACKGROUND OF THE INVENTION

Recent improvements in data processing have included the processing of instructions in parallel. In order to implement parallel processing of instructions, various techniques have been implemented including register renaming, speculative execution, and out-of-order execution.

Register renaming is a technique utilized by processors in which the processor remaps the same architectural register to a different physical register in order to avoid stalling instruction issues. This technique requires the maintenance of a greater number of physical registers than would otherwise be warranted architecturally. The processor must, therefore, continuously monitor the status of the physical register resources including how many of the physical registers are in use at a given moment, to which architectural registers are the various physical registers mapped, and which of the physical registers are available for use. In order to accomplish this task, the processor maintains a list of physical registers ("freelist") that are not in use. When an instruction is issued, the processor remaps the architectural destination register to one of the registers on the freelist. The selected physical register is then removed from the freelist. Whenever the renamed physical registers are no longer needed, these physical registers are marked free by adding them to the freelist pool. Those physical register resources, which are missing from the freelist, are considered to be "in use" or otherwise unavailable to the processor for further mapping. Where the resultant register of an instruction is to be used as a source (architectural) register for a sequentially following instruction, the source register is mapped to a renamed physical register from the freelist. In order for the processor to use the correctly associated physical register, a rename map is continuously maintained by the processor which identifies which architectural registers are mapped to which physical registers. All sequentially subsequent instructions that refer to a sequentially earlier instruction's architectural register should use the renamed physical register.

Speculative execution is a technique utilized by processors in which the processor predicts a next branch target address for a next instruction where data is unavailable to evaluate a condition for a conditional branch. By using speculative execution, processor delays which would otherwise occur in waiting for the data needed to evaluate the condition, are avoided. Whenever there is a misprediction, the processor must be returned to the state which existed prior to the branching step and the correct branch must be identified in order to proceed with execution of the correct sequence of instructions. In order to recover the state of the processor after a misprediction, one technique that has been utilized is called checkpointing wherein the machine state is stored (or checkpointed) after every speculative instruction.

Out-of-order execution is a technique utilized by processors in which the processor includes multiple execution units which are issued instructions sequentially but which may complete execution of instructions non-sequentially due to varying execution times of the instructions.

In processors where the architectural registers are renamed, provisions must exist for efficiently restoring the correct state of the architectural registers when the processor does a backup to a checkpoint due to a mispredicted branch instruction, or, when a sequentially later instruction modifies the architectural register before the detection of an execution exception due to a sequentially earlier instruction.

To elaborate, many instruction sequences in a computer program are independent of other instruction sequences. For example, in the following instruction stream, 1 Load LR1, Mem1; Load logical register LR1 with data from Mem1

2 Inc LR1; Increment logical register LR1

3 Store LR1, Mem1; Store contents of logical register LR1 into Mem1

4 Load LR2, Mem2; Load logical register LR2 with data from Mem2

5 Inc LR2; Increment logical register LR2

6 Store LR2, Mem2; Store contents of logical register LR2 into Mem2, the second three instructions (instruction 4–6) are independent of the first three instructions (instruction 1–3). That is, instructions 4–6 do not depend on the results of instructions 1–3 to execute properly. Thus, in this example, instructions 1–3 and instructions 4–6 could be executed in parallel to optimize performance. It is this concept of executing instructions in parallel and out of sequence, which underlies the executing methods of superscalar processors.

To provide for parallel execution capability, superscalar processors typically comprise more physical registers than there are logical registers. Logical registers are registers, such as LR1 and LR2 in the example above, which are referenced in the instructions. Physical registers are the registers within the processor which are actually used for storing data during processing. The extra physical registers are needed in superscalar processors in order to accommodate parallel processing. One consequence of having more physical registers than logical registers is that there is no one-to-one correspondence between the logical and physical registers. Rather, a physical register may correspond to logical register LR1 for one set of instructions and then correspond to logical register LR2 for another set of instructions. Because the relationship between logical and physical registers can change, a mapping or coordination function is performed in order to keep track of the changing relationships. In order to optimize performance in a superscalar processor, an efficient method and apparatus for coordinating the use of the physical registers is needed.

SUMMARY OF THE INVENTION

In accordance with the present invention, a data processor which executes multiple instructions in parallel uses renaming of physical registers in order to reduce delays in processing and uses checkpoints to retain the processor state and restore register resources on the occurrence of an instruction exception or branch misprediction. Additionally, the processor includes a resource reclamation random access memory (RAM) associating each issued instruction with an issue serial number (ISN) and storing information about the instruction including whether register renaming occurs, and what associated architectural and physical registers are utilized; and a resource reclamation pointer (RRP) for identifying instructions in program order that are prepared for retirement after successful execution and identifying any associated physical registers which may be added to the freelist.

The data processor includes a register file unit, a register reclaim file unit, a freelist unit, and a control unit, which coordinates the use of physical registers in a microprocessor in such a manner that allows for easy physical register assignment and convenient state restoration. The overall operation of the apparatus of the present invention is controlled by the control unit. In operation, the control unit receives an instruction, and in response, extracts a destination logical register value from the instruction. Then, the control unit obtains a free physical register identifier from the freelist unit which points to a particular physical register within the processor. Once the destination logical register value and the free physical register identifier are obtained, the control unit stores the logical register value into the register file unit in association with the obtained physical register identifier. By so doing, a relationship is established between the logical register value and the physical register identifier which can be used to map the logical register value to the particular physical register. A physical register is thus assigned or mapped to a logical register value.

In addition to establishing logical/physical register relationships, the apparatus of the present invention also performs at least two other important functions. First, if the instruction received is a branch instruction, then the apparatus creates a "checkpoint" which captures the current state of the processor. This checkpoint provides a reference point in time to which the processor can backtrack or backup if it is later determined that an incorrect branch was chosen. By creating these checkpoints, the apparatus of the present invention supports speculative execution. As a second important function, when the apparatus of the present invention assigns a new physical register to a logical register value, the old relationship between the logical register value and another physical register is saved in the register reclaim file unit. This is done so that if an execution exception (such as a divide-by-zero) is encountered which requires the execution of a trap handler, the old relationship can be easily restored. By so doing, the apparatus of the present invention provides the processor with a means for conveniently backstepping to a particular instruction before accessing a trap handler. Overall, the present invention provides a convenient and efficient method and apparatus for coordinating the use of physical registers in a microprocessor.

DETAILED DESCRIPTION OF THE PREFERRED EMBODIMENT

Figure 1:
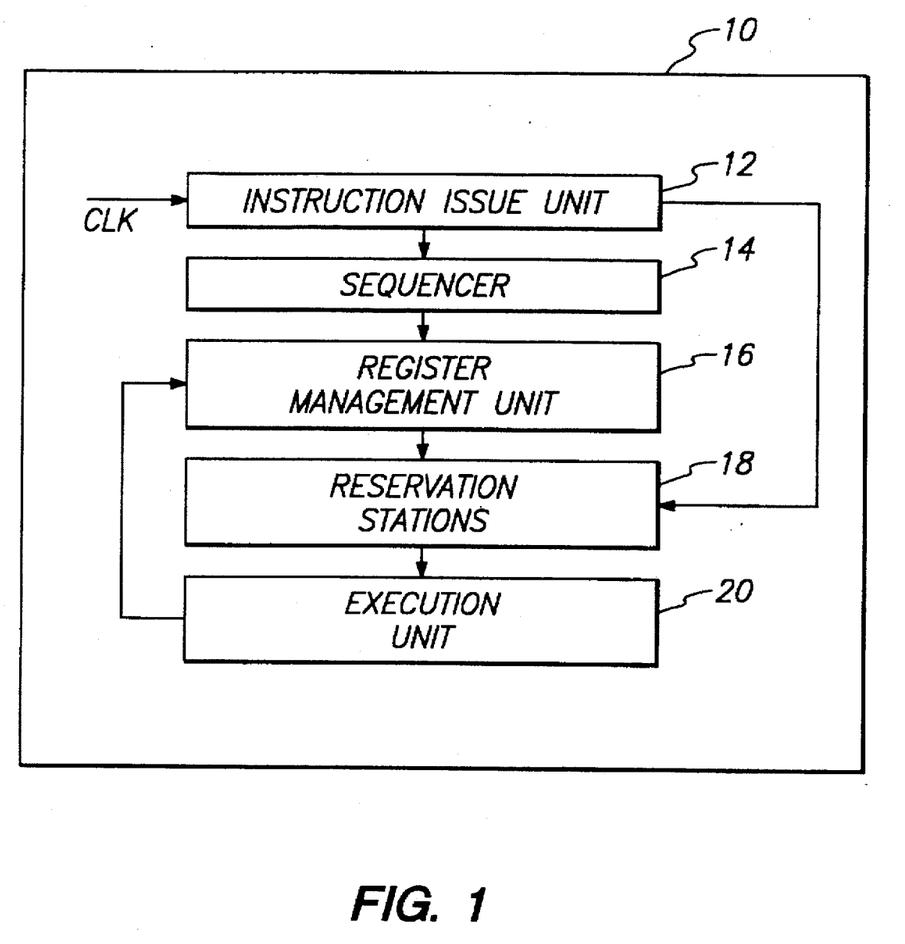
FIG. 1 is a block diagram representation of a processor wherein the present invention is implemented.

With reference to FIG. 1, there is shown a block diagram representation of a processor 10 wherein the present invention is implemented. As shown, processor 10 preferably comprises an instruction issue unit 12, a sequencer 14 coupled to the instruction issue unit 12, a register management unit 16 coupled to the sequencer 14, reservation stations 18 coupled to both the register management unit 16 and the instruction issue unit 12, and an execution unit 20 coupled to the reservation stations 18 and the register management unit 16. In the preferred embodiment, processor 10 is a superscalar processor capable of executing multiple instructions in parallel.

In processor 10, the instruction issue unit 12 receives from an external source (not shown) a series of instructions, and stores these instructions for later execution. The instruction issue unit 12 receives a clock signal as input and in each clock cycle, unit 12 issues one or more instructions for execution. The issued instructions are sent to both the sequencer 14 and the reservation stations 18. The sequencer 14, in response to the issued instructions, assigns a sequence number (Sn) to each of the instructions. As will be explained later, these sequence numbers are used by the register management unit 16 to keep track of the instructions. Once the sequence numbers are assigned to the instructions, the sequencer 14 forwards the instructions to the register management unit 16.

Operationally, computer instructions reference logical registers. These logical registers (which will be referred to herein as LR) may be source registers which contain certain data needed to execute the instruction, or these registers may be destination registers to which data resulting from the execution of the instruction is to be written. For example, in the instruction $$LR1 \div LR2 \rightarrow LR3,$$

which divides the contents of LR1 by the contents of LR2 and writes the result into LR3, LR1 and LR2 are the source registers while LR3 is the destination register.

Logical registers do not point to any physical location at which a physical register resides. To get from a logical register value to a physical register, a translation or mapping process is carried out. This mapping function is one of the functions performed by the register management unit 16. If there were a one-to-one correspondence between logical and physical registers, and if their relationships were constant, then the mapping function would be a simple one. All that would be needed is a static translation table. However, as noted previously, there is no constant one-to-one correspondence in superscalar processors. Instead, relationships between logical and physical registers are constantly changing. Hence, the register management unit 16 needs to be able to handle the changing relationships.

As an additional complication, superscalar processors engage in speculative execution. That is, whenever a branch instruction is encountered, a guess or prediction is made as to which branch will actually be taken. Once the prediction is made, the instructions following the predicted branch are executed. If later it is determined that the wrong branch was predicted, then the processor 10 will need to backtrack or "backup" to the branch instruction, choose the proper branch, and then execute instructions following that branch. In order to backup properly, the processor 10 will need to be restored to the state just prior to the branching operation. This involves, among other operations, restoring the relationships between the logical and physical registers. To accommodate this backup procedure, the register management unit 16 preferably coordinates the use of the physical registers in such a way that relationship restoration is possible.

As yet a further complication, superscalar processors process instructions in parallel and out of sequence. As a result, if an execution exception (such as a divide-by-zero) is encountered which requires the execution of a trap handler, it becomes necessary to "backstep" to the instruction invoking the exception before executing the trap handler. Like the backup procedure, this "backstep" procedure involves, among other operations, restoring the relationships between the logical and physical registers. Unlike the backup procedure, however, backstepping involves an instruction other than a branch instruction. This requires different handling, as will be explained below. The management unit 16 preferably manages the use of the physical registers in such a way that allows for this backstepping procedure. With the above background information in mind, the register management unit 16 will now be described in greater detail.

Figure 2:
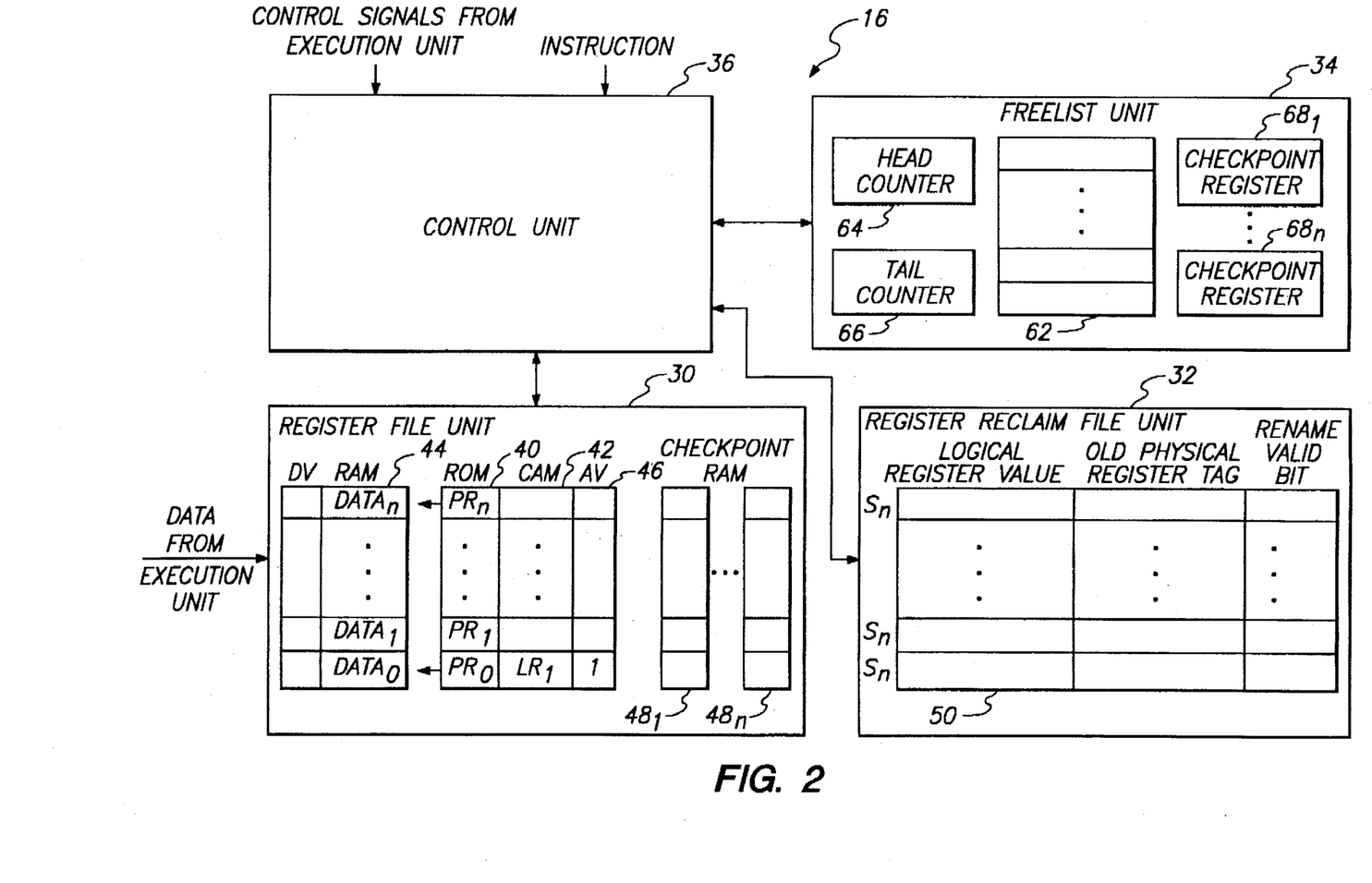
FIG. 2 is a detailed block diagram representation of the register management unit 16 of the present invention.

FIG. 2 shows a detailed block diagram of the preferred embodiment of the register management unit 16. As shown, management unit 16 preferably comprises a register file unit 30, a register reclaim file unit 32, a freelist unit 34, and a control unit 36 for controlling the overall operation of the management unit 16.

The register file unit 30 is the component (or set of components) in management unit 16 which is mainly responsible for mapping logical registers to physical registers, and for storing data. Register file unit 30 preferably comprises a number of different components, including a read-only-memory (ROM) 40, a content addressable memory (CAM) 42, a data random access memory (data RAM) 44, an address valid (AV) RAM 46, and at least one, and preferably a plurality of checkpoint RAM's $48_1$–$48_n$. In register file unit 30, the ROM 40 is used to store all of the physical register address identifiers $PR_0$–$PR_n$ for all of the physical registers in the processor 10. Each of the physical address identifiers $PR_0$–$PR_n$ points to an entry in the data RAM 44 wherein data corresponding to the physical register identifier is stored, along with a data valid (DV) bit. Preferably, there is a one-to-one correspondence between the entries of the ROM 40 and the entries of the data RAM 44. Since the physical register identifiers $PR_0$–$PR_n$ are stored in ROM 40, they cannot be altered by writing operations; hence, the physical register identifiers $PR_0$–$PR_n$ remain constant for the life of the processor 10.

The CAM 42 in register file unit 30 is used to store logical register values corresponding to the physical register identifiers. Unlike ROM 40, the contents of the CAM 42 can be and are frequently changed. Preferably, there is a one-to-one correspondence between the entries of the CAM 42, the AV RAM 46, and the ROM 40, as shown in FIG. 2. Together, ROM 40, CAM 42, and AV RAM 46 provide a mechanism for quickly and easily assigning a physical register to a logical register. To illustrate, suppose that it is desirable to assign physical register $PR_0$ to logical register $LR_1$. To establish such a relationship, all that needs to be done is to store the logical register value $LR_1$ into the entry of the CAM 42 corresponding to the physical register identifier $PR_0$, and to set the AV bit in AV RAM 46 corresponding to the physical register identifier $PR_0$. Once that is done, the next time the logical register $LR_1$ is asserted in an instruction, the CAM 42 will search for $LR_1$ and will signal a "hit" in the entry corresponding to the physical register identifier $PR_0$. This, in turn, will cause the identifier $PR_0$ to be outputted from the ROM 40, which in turn, will cause the corresponding entry in the data RAM 44 to be accessed. Thus, as shown by this example, storing a logical register value in CAM 42 establishes a direct relationship between a logical address and a physical address. To alter this relationship and to establish a new one, all that is needed is to store the logical register value $LR_1$ into a different entry in the CAM 42.

Register file unit 30 preferably further comprises checkpoint RAM's $48_1$–$48_n$ for temporarily storing the contents of the AV RAM 46. As will be explained in greater detail in a later section, whenever a speculative branch instruction is encountered, a "checkpoint" is made by storing the contents of the AV RAM 46 into one of the checkpoint RAM's $48_1$–$48_n$. By storing the contents of the AV RAM 46, the state of the system prior to branching is captured. This checkpoint provides a reference point to backup to in case an incorrect branch is predicted. Register file unit 30 preferably comprises a plurality of checkpoint RAM's 48 in order to allow a plurality of checkpoints to be made. This in turn allows the processor 10 to execute through multiple levels of nested branches.

The register reclaim file unit 32 is the component in management unit 16 which makes it possible for the unit 16 to backstep to an instruction causing an execution exception. Preferably, unit 32 comprises a resource reclaim RAM 50 which has a plurality of entries. Each of the entries in the reclaim RAM 50 is preferably indexed with an issue sequence (or serial) number corresponding to a particular issued instruction. Associated with each entry is a rename valid bit portion, a first portion which stores a renamed architectural (logical) register identifier, and a second portion which stores an old physical register identifier. The rename valid bit portion stores a 'zero', if the particular instruction requires no renaming, and stores a 'one', if the particular instruction requires renaming of an architectural register. The old physical register identifier corresponds to the renamed architectural register identifier immediately before issue of the particular instruction. In effect, each entry of the reclaim RAM 50 stores a state of the system just prior to the execution of a particular instruction. Hence, the information stored in reclaim RAM 50 may be utilized to restore the system to the state that it had immediately prior to a given instruction. This aspect of the management unit 16 makes backstepping possible.

Register management unit 16 preferably further comprises a freelist unit 34 which stores the physical register identifiers which are free to be assigned to logical registers. The freelist unit 34 preferably comprises a freelist RAM 62 which stores free physical address identifiers, a head register 64 which stores a "head" pointer, a tail register 66 which stores a "tail" pointer, and at least one, and preferably a plurality of checkpoint registers $68_1$–$68_n$. The freelist RAM 62 is preferably operated as a FIFO storage. The head pointer points to the next physical register identifier in the RAM 62 which should be assigned to a logical register, while the tail pointer points to the last physical register identifier stored in the RAM 62. Each time a free physical register identifier is assigned to a logical register, the head pointer is incremented, and each time a free physical register identifier is added to the RAM 62, the tail pointer is incremented. Preferably, the freelist RAM 62 has at least (P-L) entries where P is the number of physical register identifiers and L is the number of logical register values.

With regard to the checkpoint registers $68_1$–$68_n$, these are used to store the value of the head pointer whenever a speculative branch instruction is encountered. By storing the value of the head pointer, the state of the freelist unit 34 is saved. This in turn allows the state of the freelist RAM 62 to be restored if necessary. The checkpoint registers 48 provide support for the backup procedure. Preferably, freelist unit 34 comprises a plurality of checkpoint registers 48 to allow multiple checkpoints to be made. Multiple checkpoints enable the processor 10 to execute through multiple levels of nested branches.

The register management unit 16 preferably further comprises a control unit 36 for coordinating the operation of the other components 30, 32, 34, and for controlling the overall operation of the management unit 16. In the preferred embodiment, the control unit 36 is implemented in hardware as a state machine. The control unit 36 will be described in greater detail as operation of the processor 10 is described.

Referring once again to FIG. 1, the reservation stations 18 of the processor 10 are responsible for two primary functions. First, the reservation stations 18 capture all of the source data needed to execute an instruction. This data is received from the register management unit 16. Second, reservation stations 18 schedule instructions for execution. Instructions may be selected for execution if the DV bits from register file unit 30 are asserted for all sources and if no older instructions stored in the reservation stations are eligible. The instructions, once selected, are passed on to the execution unit 20 for execution. Overall, stations 18 are responsible for the smooth execution of instructions. All of the relevant elements of the processor 10 have now been discussed. The overall operation of the processor 10 will now be described.

Before the processor 10 is used in regular operation, it first needs to be initialized. Several steps are carried out in the initialization process. First, each and every logical register value is stored into one of the entries of the CAM 42. The AV bits corresponding to the CAM entries in which logical register values are stored are set. This ensures that before operation, all of the logical register values are validly mapped to a physical register. The particular mapping (i.e. which logical register value is mapped to which physical register) is arbitrary. No single logical register value is mapped to more than one physical register, however.

Once all of the logical register values are stored into the CAM 42, the free physical register are known. Accordingly, the physical register identifiers corresponding to the free registers are stored into the freelist RAM 62. This provides an indication as to which physical registers are free and may be assigned.

Figure 3A:
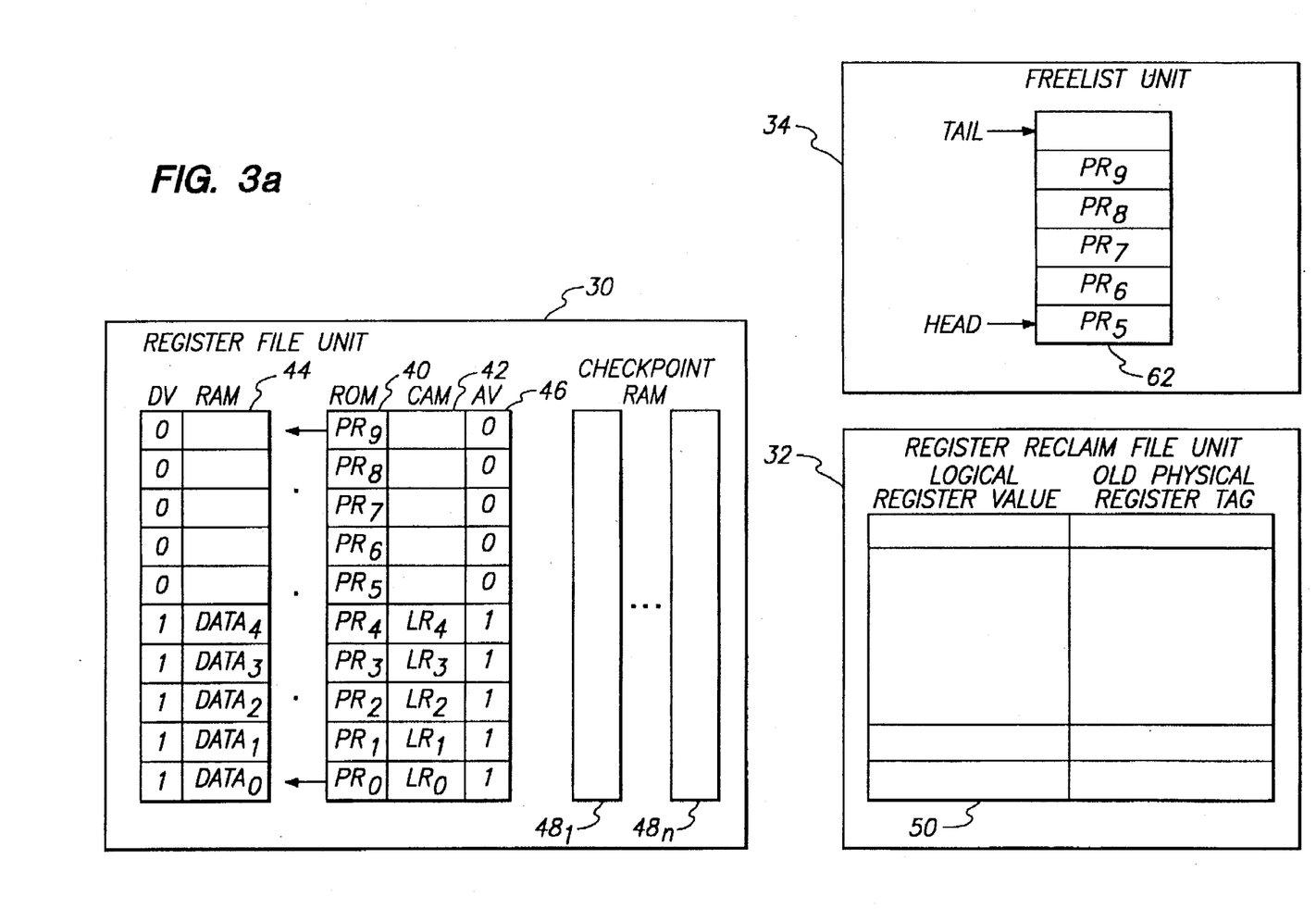
FIGS. 3a–3c are block diagram representations of the register file unit 30, the register reclaim file unit 32, and the freelist unit 34 of the register management unit 16 in several sample states.

As an example, suppose that the management unit 16 is initialized as shown in FIG. 3a. More specifically, suppose that physical register $PR_0$ has been assigned to logical register $LR_0$, $PR_1$ has been assigned to $LR_1$, $PR_2$ has been assigned to $LR_2$, $PR_3$ has been assigned to $LR_3$, and $PR_4$ has been assigned to $LR_4$. After assignment, data ($Data_0$–$Data_4$) may be written into the corresponding locations in the data RAM 44, along with asserted data valid bits. As shown in FIG. 3a, physical registers $PR_5$–$PR_9$ have not been assigned to any logical register value. Thus, they are considered "free", which means that they may be assigned logical register values in upcoming operations. Thus, the physical register identifiers $PR_5$–$PR_9$ associated with the free physical registers are stored in the freelist unit 34. The head pointer in the freelist unit is pointing to $PR_5$, thereby indicating that $PR_5$ will be the next physical register assigned to a logical register value. Currently, no information is stored in the register reclaim file unit 32.

Now, suppose that the instruction issue unit 12 issues the following instruction:

$$LR_0 \div LR_1 \rightarrow LR_3.$$

This instruction, when executed, will cause the data in logical registers $LR_0$ to be divided by the data in logical register $LR_1$, and will cause the result to be stored into logical register $LR_3$. For this instruction, logical registers $LR_0$ and $LR_1$ are the source logical registers from which data will be drawn, while logical register $LR_3$ is the destination logical register. Once issued, the instruction is passed on to the sequencer 14, where a sequence number is assigned to the instruction. Suppose that sequence number 0 is assigned. Thus, the instruction becomes:

Instruction #0: $LR_0 \div LR_1 \rightarrow LR_3.$

Once a sequence number is assigned, the instruction is passed on to the control unit 36 of the register management unit 16 for processing.

Figure 4:
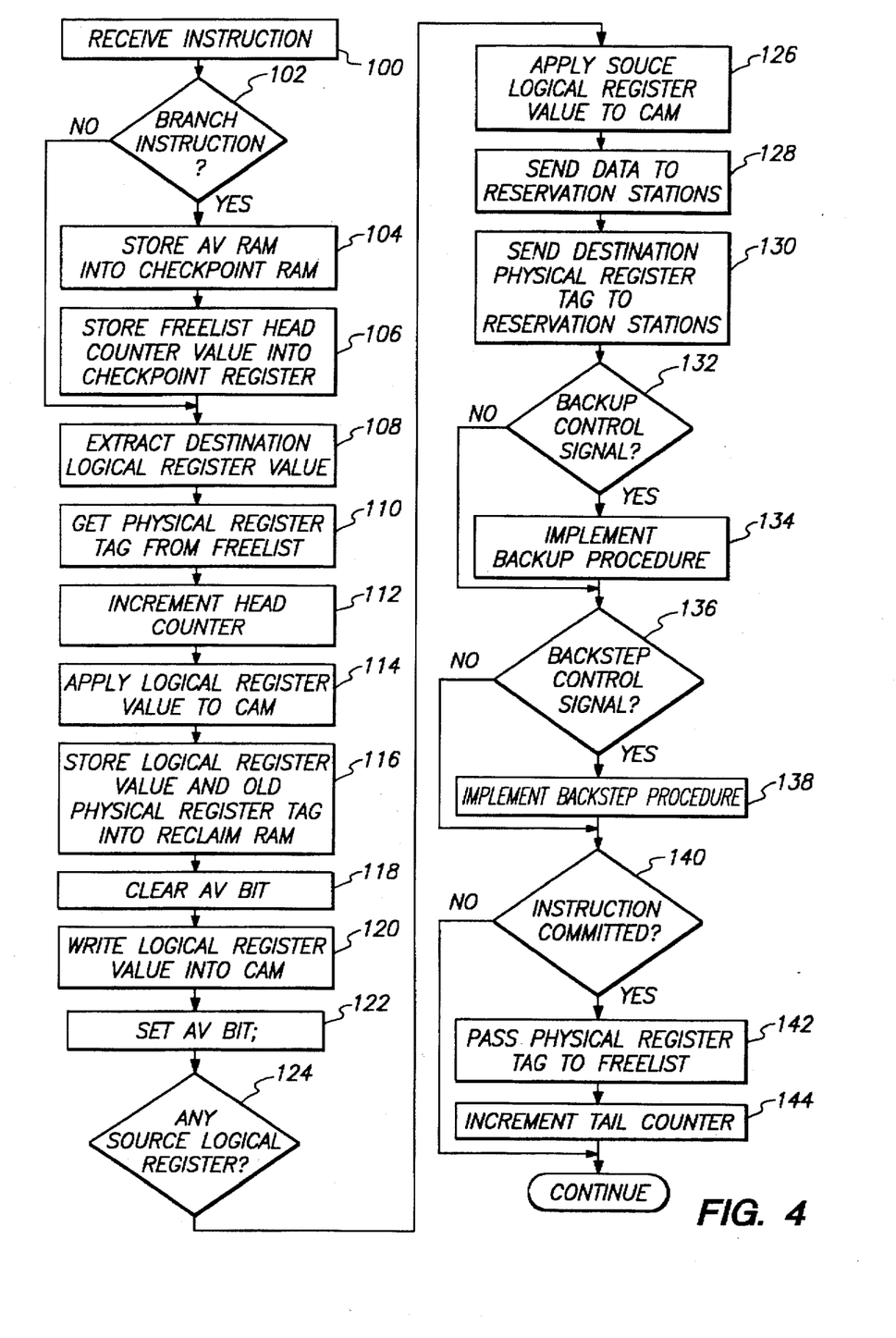
FIG. 4 is an operational flow diagram of the control unit 36 of the control unit 36 of the register management unit 16.

In the management unit 16, it is the control unit 36 which receives and processes new instructions. An operational flow diagram for the control unit 36 is shown in FIG. 4. Preferably, control unit 36 begins operation by receiving 100 the instruction and then determining 102 whether the instruction is a speculative branch instruction. If the instruction is a speculative branch instruction, then control unit 36 preferably creates a "checkpoint" to provide a reference point to which the processor 10 can backup in case the wrong branch of the branch instruction is predicted. In creating a checkpoint, two operations are taken. First, the contents of the AV RAM 46 are stored 104 into one of the checkpoint RAM's $48_1$–$48_n$. This operation preserves for later reference all of the current relationships between the logical registers and the physical registers. Second, the contents of the head counter 64 in the freelist unit 34 are stored 106 into one of the checkpoint registers $68_1$–$68_n$. By storing these two sets of information, the current state of the processor 10 is recorded. This information may be retrieved at a later time to restore the state of the processor 10 to that just prior to the execution of the speculative branch instruction. As will be explained in greater detail later, this aspect of the management unit 16 enables the processor 10 to carry out the backup procedure of the present invention.

In the present example, the instruction $(LR_0 \div LR_1 \rightarrow LR_3)$ is not a speculative branch instruction; thus, control unit 36 bypasses steps 104 and 106 and proceeds to step 108 to extract a destination logical register value from the instruction. In the present example, the destination logical register value is $LR_3$. Once the destination logical register value is extracted, control unit 36 accesses the freelist RAM 62 to extract 110 the next available physical register identifier therefrom. As shown in FIG. 3a, the head pointer is currently pointing to physical register identifier $PR_5$; thus, $PR_5$ is selected as the physical register to assign to the logical register $LR_3$. Thereafter, control unit 36 increments 112 the head counter 64 to cause the counter to point to the next available free physical register, which in the example is $PR_6$.

Figure 3B:
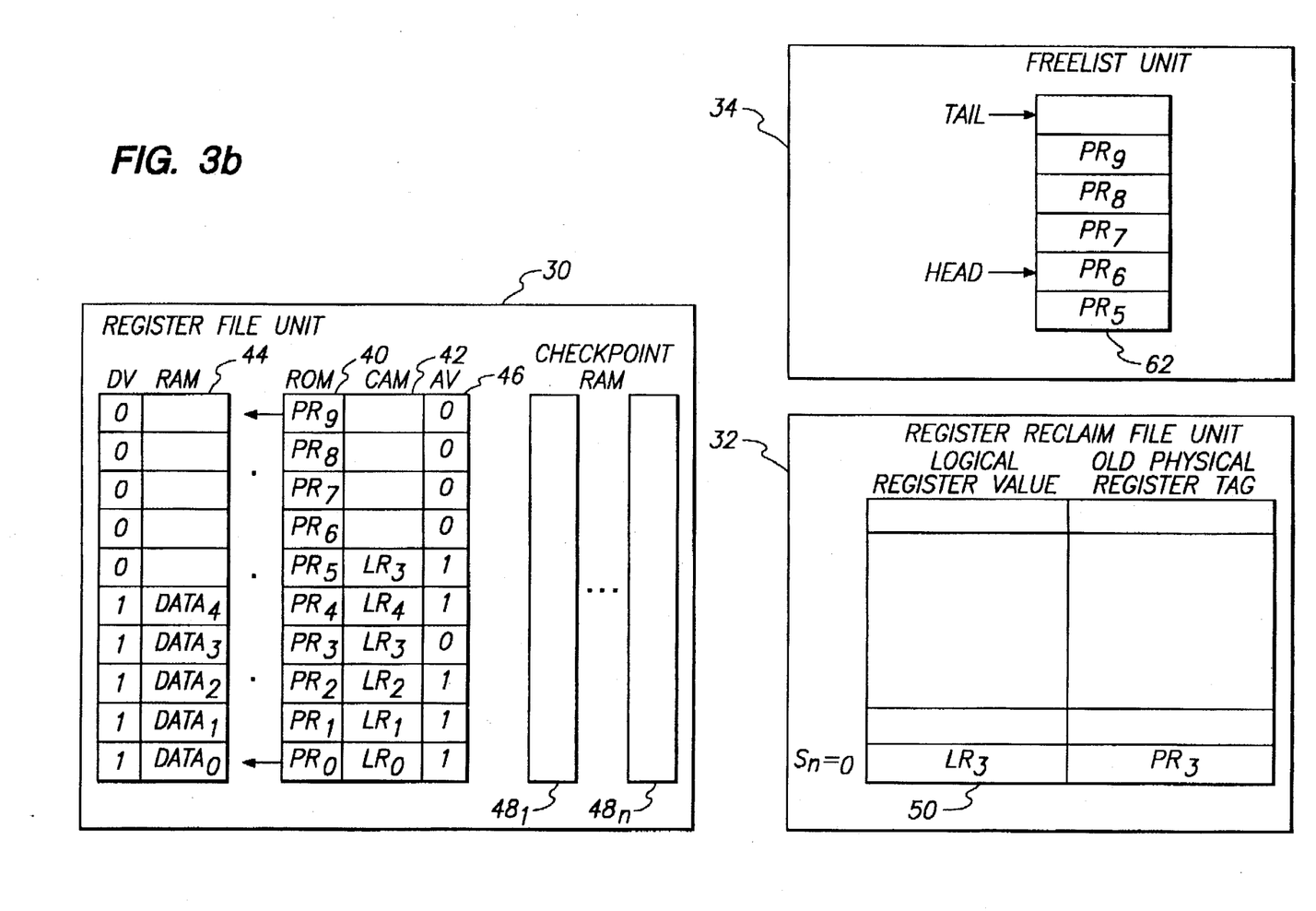

After a physical register identifier is retrieved from the freelist unit 34, control unit 36 applies 114 the logical register value $LR_3$ to the CAM 42. In effect, this operation checks for the current physical register assignment for logical register $LR_3$. In the present example, $LR_3$ is currently assigned to physical register $PR_3$, as shown in the register file unit 30. Thus, when $LR_3$ is applied to the CAM 42, a hit will be found which will cause the physical register identifier $PR_3$ to be read out of the ROM 40. This physical register identifier $PR_3$, along with the logical register value $LR_3$, is then stored into the reclaim RAM 50 in the entry corresponding to the sequence number of the current instruction (sequence #0), as shown in FIG. 3b. The information in reclaim RAM 50 will be used, if necessary, to backstep the processor 10 at a later time to the current state of the processor 10.

After the logical register value $LR_3$ and its corresponding old physical register identifier $PR_3$ are stored into the reclaim RAM 50, control unit 36 clears the AV bit corresponding to the old physical register assignment, which in the example is the AV bit in AV RAM 46 corresponding to the physical register identifier $PR_3$. Once that is done, control unit 36 loads 120 the logical register value $LR_3$ into the CAM 42 in the entry corresponding to the new physical register identifier, which is $PR_5$. The logical register value $LR_3$ is thus assigned to a new physical register. Thereafter, the AV bit corresponding to physical register $PR_5$ is set 122 to indicate that this is now the current physical register assignment for logical register $LR_3$. Note, however, that the data valid DV bit corresponding to $PR_5$ is not set. This is because no data has yet been written into the corresponding entry of the data RAM 44 because the instruction has not yet been executed. The DV bit will be set once the instruction is executed and appropriate data is stored into the proper entry of the data RAM 44.

Note from FIG. 3b that at this point, the CAM 42 has two entries wherein logical register value $LR_3$ is stored. This would appear to cause confusion. However, note that only the AV bit corresponding to the current physical register assignment ($PR_5$) is set, thereby indicating that the entry corresponding to $PR_5$ is the current assignment. The AV bit corresponding to the old physical register ($PR_3$) is not set. This manipulation of the AV bit forestalls any confusion that might arise due to multiple instances of the same logical register value. Using the process thus far described, a destination logical register may be assigned to a new and different physical register.

The assignment of a new physical register to a destination logical register is only one of the functions performed by control unit 36. The other function is to retrieve the source data needed to execute the instruction. Steps 124–130 of FIG. 4 illustrate this retrieval process. In the present example, the source logical registers are $LR_0$ and $LR_1$. Hence, in order to execute the instruction, data will need to be retrieved from the storage registers indicated by $LR_0$ and $LR_1$.

In carrying out the retrieval process, control unit 36 first determines 124 whether any source logical registers are indicated by the instruction. If source logical registers are indicated by the instruction, as is the case in the present example, then control unit 36 begins the retrieval process by applying 126 the source logical registers $LR_0$, $LR_1$ to the CAM 42. Specifically, when $LR_0$ is applied to CAM 42, a hit is found in the entry of the CAM 42 corresponding to physical register identifier $PR_0$. Since the AV bit for this entry is set to "1", this hit causes the physical register identifier $PR_0$ to be outputted from the ROM 40, which in turn, causes the corresponding data ($Data_0$) to be outputted from the data RAM 44. The data from logical register $LR_0$ is thereafter sent 128 to the reservation stations 18. Since the data valid DV bit for this entry is set to "1", the data will be used by the reservation stations in executing the instruction. A similar process takes place when $LR_1$ is applied to the CAM 42. Specifically, the application of $LR_1$ causes a hit to be found in the entry of the CAM 42 corresponding to physical register identifier $PR_1$. This hit causes the physical register identifier $PR_1$ to be outputted from ROM 40. This in turn causes the data ($Data_1$) corresponding to $PR_1$ to be outputted from the data RAM 44 to the reservation stations. Data from logical register $LR_1$ is thus passed on to the reservation stations. Again, since the data valid bit corresponding to the outputted data is set, the reservation stations 18 will use the data in executing the instruction.

After data from the source logical registers $LR_0$, $LR_1$ are sent to the reservation stations 18, control unit 36 further sends 130 the physical register identifier assigned to the destination logical register. In the present invention, the destination logical register is $LR_3$ and the physical register assigned to $LR_3$ is $PR_5$. Hence, in step 130, control unit 36 sends physical address identifier $PR_5$ to the reservation stations. After step 130, the reservation stations 18 have all of the information needed to execute the instruction. Thus, stations 18 schedule the instruction for execution, and at the appropriate time, sends the instruction along with the information discussed above to the execution unit 20. In response, execution unit 20 executes the instruction and writes the resulting data into an appropriate entry in the data RAM 44. Since the physical register identifier $PR_5$ was sent to the execution unit 20, the resulting data will be written into the entry of the data RAM 44 corresponding to the physical register identifier $PR_5$, which is the correct entry. In addition, execution unit 20 preferably sets the data valid bit corresponding to the entry to indicate that the data in the entry is now valid and can be used as source data. Thereafter, execution of the instruction is complete.

The process described above is what takes place when an instruction executes smoothly. However, as noted previously, two events may occur which may affect smooth execution. The first event is an acknowledgment that an incorrect branch was taken at a speculative branch instruction. The second event is the invocation of an execution exception which requires a trap handler to be executed. To remedy the first event, a backup procedure is implemented to restore the processor 10 to the state it had just prior to the branch instruction. To remedy the second event, a backstep procedure is implemented to restore the processor 10 to the state it had just prior to the instruction invoking the execution exception. In the event that an incorrect branch was taken, the sequencer 14 will issue a "backup" control signal to the control unit 36 of the register management unit 16. In the event of an execution exception, the execution unit 20 will issue a "backstep" control signal to the control unit 36. In steps 132 and 136, control unit 36 checks for these control signals. If one of these control signals is detected, then control unit 36 will take appropriate action.

Figure 3C:
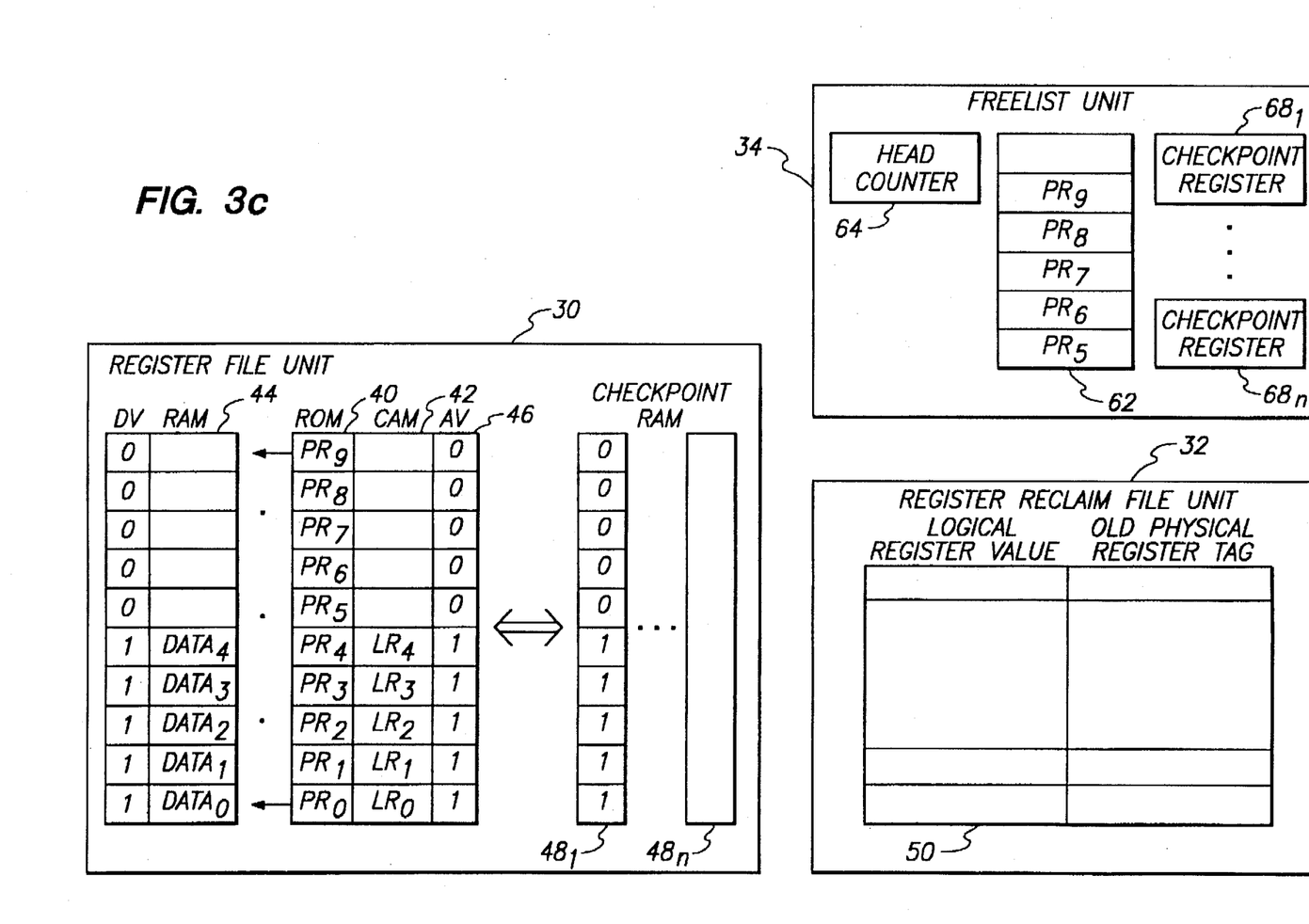

To illustrate the backup procedure, suppose that a speculative branch instruction is issued and sent to the register management unit 16. In processing this instruction, control unit 36 first determines 102 (FIG. 4) whether the instruction is a speculative branch instruction. If the instruction is a speculative branch instruction, as it is in the present example, then control unit 36 proceeds to carry out steps 104 and 106 to create a "checkpoint". In step 104, the contents of the AV RAM 46 are stored into one of the checkpoint RAM's $48_1$, as shown in FIG. 3c. In step 106, the contents of the head counter 64 in the freelist unit 34 are stored into one of the checkpoint registers $68_1$. These two operations preserve the state of the processor 10 prior to execution of the branch instruction to create a reference state to which the processor may return. Once that is done, the instruction is processed in the same manner as other instructions.

Figure 5:
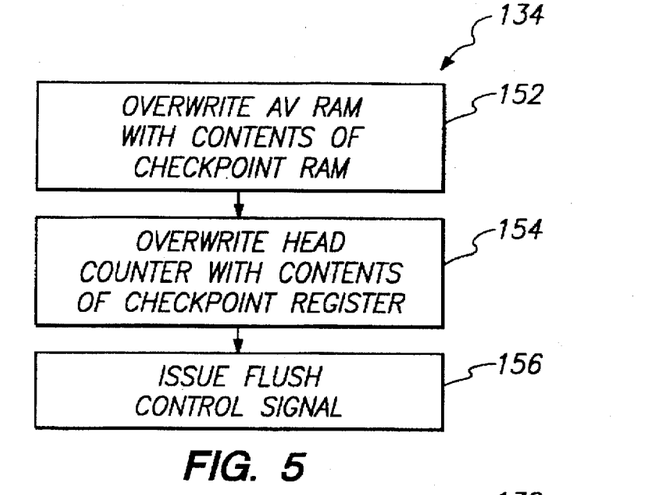
FIG. 5 is a more detailed flow diagram for the backup process 134 of FIG. 4.

Suppose now that during the following instruction or several instructions thereafter it is discovered that a speculative branch was mis-predicted and that a wrong branch was taken. In such a case, it will be necessary to restore the processor 10 to the state that it had just prior to the branch instruction. This restoration or backup is achieved as follows. First, the sequence 14 generates and sends a "backup" signal to the control unit 36. This "backup" signal is detected by control unit 36 in step 132 and in response, control unit 36 implements the backup procedure shown in FIG. 5. Preferably, control unit 36 begins the backup procedure by overwriting 152 the contents of the AV RAM 46 with the contents of the checkpoint RAM $48_1$ (FIG. 3c) which were stored in the checkpoint RAM 48a during step 104. Further, control unit 36 overwrites 154 the contents of the head counter 64 in the freelist unit 34 with the contents of the checkpoint register $68_1$ which were stored in the checkpoint register $68_1$ in step 106. By carrying out these two steps, control unit 36 restores the processor 10 to the state that it had just prior to the branch. Processor backup is thus achieved.

It is sometimes necessary to restore a machine state not only to a checkpointed location but to an instruction which lies between checkpoints. An example of such a situation is one where an instruction encounters a divide-by-zero condition. Since a divide-by-zero is not possible, such an instruction usually invokes an exception trap. Before accessing the trap handler, however, it is first necessary to backstep the machine state to that which existed immediately after the instruction was executed. This "backstep" is usually difficult to achieve because there is no checkpoint created for the instruction since the instruction is not a branch instruction. With the present invention, however, backstepping to an instruction can be performed easily.

Figure 6:
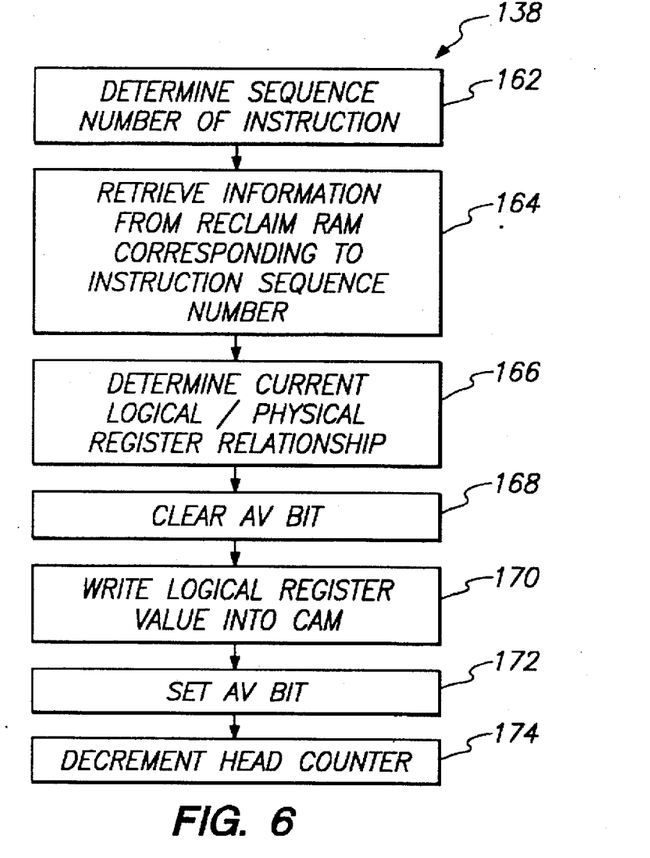
FIG. 6 is a more detailed flow diagram for the backstep process 138 of FIG. 4.

To illustrate this backstep procedure, reference will be made to FIGS. 3b, 4, and 6, and to a specific example. To draw upon a previously used example, suppose again that the instruction Instruction #0: $LR_0 + LR_1 \rightarrow LR_3$ is received by the control unit 36 of the register management unit 16. Suppose further again: (1) that the logical register value $LR_3$ is written into the CAM entry corresponding to the physical identifier entry $PR_5$ as shown in FIG. 3b, thereby assigning $LR_3$ to physical register $PR_5$; and (2) that the logical register value $LR_3$ and its corresponding former physical register identifier $PR_3$ are stored into the reclaim RAM 50 in the entry indexed by the instruction sequence #0. The writing of these values into CAM 42 and reclaim RAM 50 were described previously with reference to steps 108–122 of FIG. 4. Hence, these operations need not be re-described here. The important points to note here are: (1) that there are two instances of $LR_3$ stored in the CAM 42, one corresponding to the currently assigned physical register identifier $PR_5$, and one corresponding to the formerly assigned physical register identifier $PR_3$; and (2) that the reclaim RAM 50 stores the former relationship between $LR_3$ and $PR_3$. It is the information in reclaim RAM 50 which allows for easy backstepping.

To illustrate how backstepping is achieved, suppose that the data corresponding to $LR_1$ is a zero. If such is the case, then the above instruction would be a divide-by-zero operation. Upon executing this instruction, the execution unit 20 will issue a "backstep" control signal. This signal is detected by control unit 36 in step 136, and in response, control unit 36 carries out the backstep procedure 138 of the present invention. The backstep procedure is shown in greater detail in FIG. 6.

Preferably, control unit 36 begins the backstep procedure by determining 162 the sequence number associated with the instruction which caused the execution exception. In the present example, the sequence number associated with the instruction is 0. Once determined, the instruction sequence number is used as an index to retrieve 164 from the reclaim RAM 50 the logical register value $LR_3$ and its corresponding former physical register identifier $PR_3$. Thereafter, control unit 36 applies the logical register value $LR_3$ retrieved from the reclaim RAM 50 to the CAM 42 to determine 166 which physical register is currently assigned to the logical register $LR_3$. As shown in FIG. 3b, physical register $PR_5$ is currently assigned to $LR_3$. Once the current assignment is found, control unit 36 clears 168 the AV bit corresponding to the currently assigned physical register. Hence, in the present example, the AV bit corresponding to $PR_5$ is cleared. Thereafter, control unit 36 writes 170 the logical register value $LR_3$ into the CAM 42 at an entry corresponding to the former physical address identifier. Hence, in the present example, $LR_3$ is written into the CAM entry corresponding to the physical register identifier $PR_3$. Once that is done, control unit 36 sets 172 the AV bit corresponding to the former physical address identifier $PR_3$. By carrying out the above steps, the current logical register/physical register relationship is erased and the former relationship is reinstated. As a final step, the head counter 64 in the freelist unit 34 is decremented 174 so that it once again points to $PR_5$ as it did before the above instruction was processed. Thus, the state of the processor 10 is restored or backstepped to the desired state. The trap handler may now be accessed.

At this point, it should be noted that the backstep procedure is quite similar to the register assignment procedure discussed in steps 108–122 of FIG. 4. The only difference is that instead of assigning the logical register value to a free physical register, the logical register value is assigned back to a physical register with which it had a previous relationship. The similarity between the two processes is significant because it means that the same hardware used to implement the register assignment process can be used to implement the backstep procedure. Thus, very little additional hardware (in fact, a simple additional multiplexer) is required to implement the backstep procedure.

The backstepping procedure has been described as backstepping over only one instruction. It should be noted, however, that the method and apparatus of the present invention may be used to backstep over any desired number of instructions. Typically, however, the number of instructions which may be backstepped over is limited to the number of instructions which can be renamed per cycle. This number may vary from system to system.

Referring again to FIG. 4, after control unit 36 carries out steps 100–138, it makes a determination as to whether to send a certain physical register identifier back to the freelist unit to make the corresponding physical register available again for reassignment. A physical register identifier will be sent or released to the freelist unit 34 if the instruction for which the physical register is used is committed. An instruction will be committed if the instruction successfully completed execution and if all previous instructions completed execution without error or exceptions. In step 140, control unit 36 makes a determination as to whether a certain instruction has been committed. If so, then control unit 36 releases the physical register identifier or identifiers associated with the instruction to the freelist unit 34. Continuing with the present example, suppose that the instruction $LR_0 \div LR_1 \rightarrow LR_3$ is committed. In such a case, the physical register identifier $PR_3$ (stored in the reclaim RAM 50) corresponding to the destination register $LR_3$ is passed 142 to the freelist unit 34. More specifically, control unit 36 adds the physical register identifier $PR_3$ to the tail of the freelist RAM 62 and then increments the tail counter 66. The free register $PR_3$ is thus added to the list of physical registers which may be assigned to a logical register.

The present invention has been described with reference to specific examples. However, the invention should not be construed to be so limited. Various modifications may be made by one of ordinary skill in the art with the benefit of this disclosure without departing from the spirit of the invention. For example, for the sake of simplicity, the invention has been described with the assumption that only one instruction is issued per cycle. It should be noted, though, that the invention may be and is actually intended to be implemented in processors which issue multiple instructions per clock cycle. To accommodate multiple instructions per cycle, more ports may be added to the register file unit 30, the register reclaim file unit 32, and the freelist unit 34. These and other modifications are within the spirit and contemplation of the invention. Therefore, the present invention should not be limited by the examples used to illustrate it but only by the scope of the appended claims.

What is claimed is:

1. In a processor that facilitates out of order execution of a plurality of issued instructions, the issued instructions having an issue sequence and a corresponding issue sequence number, a method for maintaining an association of logical registers to physical registers, the method comprising:

identifying an issue sequence number of a selected instruction;

determining whether a logical register is referenced by the selected instruction and if a logical register is referenced:

associating the referenced logical register with a first physical register selected from a register freelist, and referencing a register file unit to determine whether the referenced logical register is associated with a second physical register from a previously issued instruction;

if the register file unit referencing step reveals an association between the referenced logical register and a second physical register:

storing state information about the selected instruction in a register reclaim unit, the state information including an identification of the issue sequence number of the selected instruction and the association of the referenced logical register with the second physical register, and updating the register file unit to clear the association of the referenced logical register with the second physical register; and validating the association of the referenced logical register with the first physical register in the register file unit.

2. The method of claim 1, wherein the step of validating the association of the referenced logical register with the first register in the register file unit comprises:

storing an identification of the referenced logical register in an entry in the register file unit that corresponds to the first physical register; and setting a first validity bit in the register file unit, the first validity bit corresponding to the first physical register.

3. The method of claim 2, wherein the step of referencing the register file unit to determine whether the referenced logical register is associated with a second physical register from a previously issued instruction comprises:

searching for the referenced logical register in the register file unit; and upon detection of the referenced logical register in a register file unit entry, determining a physical register value that corresponds to the referenced logical register.

4. The method of claim 3, wherein the step of updating the register file unit to clear the association of the referenced logical register with the second register comprises:

clearing a second validity bit in the register file unit, the second validity bit corresponding to the second physical register.

5. The method of claim 1, further comprising:

establishing a checkpoint having a particular association of logical registers to physical registers;

storing validity bits in the register file unit that correspond to each of the physical registers; and storing information corresponding to the status of the register freelist for the checkpoint.

6. The method of claim 5, further comprising the step of implementing a backup procedure to restore the particular association of logical registers to physical registers for the checkpoint, the backup procedure comprising:

retrieving the register file unit validity bits for the checkpoint;

retrieving the information corresponding to the status of the register freelist for the checkpoint; and using the register file unit validity bits and the status of the register freelist to restore the particular association of logical registers to physical registers.

7. The method of claim 1, further comprising the step of implementing a backstep procedure to restore an intermediate association of logical registers to physical registers, the backstep procedure comprising:

determining the issue sequence number of the selected instruction;

using the issue sequence number to retrieve the association of the referenced logical register with the second physical register from the register reclaim unit;

updating the register file unit to clear a validity bit corresponding to the association of the referenced logical register with the first physical register;

storing the association of the referenced logical register with the second physical register in the register file unit; and setting a validity bit corresponding to the association of the referenced logical register with the second physical register.

8. In a processor that facilitates out of order execution of a plurality of issued instructions, the issued instructions having an issue sequence and a corresponding issue sequence number, a register management unit for maintaining an association of logical registers to physical registers, the register management unit comprising:

an input, for receiving a selected instruction with an issue sequence number;

a register freelist including a list of free physical registers;

a register file unit including a plurality of entries, each entry associating a logical register to a physical register and including a validity bit that corresponds to the association of the logical register to the physical register;

a register reclaim unit, for storing state information about issued instructions, the state information including an issue sequence number for an issued instruction and the association of a logical register for the issued instruction with a prior physical register from a previous instruction;

a control unit, in communication with the register free list, the register file unit and the register reclaim unit, for determining whether a logical register is referenced by the selected instruction; associating the referenced logical register with a first physical register selected from the list of free registers; referencing the register file unit to determine whether the referenced logical register is associated with a second physical register from a previously issued instruction; updating the register reclaim unit to include an identification of the selected instruction issue sequence number and the association of the referenced logical register with the second physical register; and updating the register file unit to clear the association of the referenced logical register with the second physical register and validate the association of the referenced logical register with the first physical register.

9. The register management unit of claim 8, wherein the register file unit includes a checkpoint memory for storing validity bits for each physical register entry in the register file unit, the register freelist includes a checkpoint register for storing information corresponding to the status of the register freelist, and the control unit includes routines for establishing a checkpoint having a particular association of logical registers to physical registers by updating the checkpoint memory to store the physical register validity bits for the checkpoint and updating the checkpoint register to store information corresponding to the status of the register freelist for the checkpoint.

10. The register management unit of claim 9, wherein the control unit includes routines for implementing a backup procedure to restore the particular association of logical registers to physical registers for the checkpoint, the backup procedure comprising:

retrieving the register file unit validity bits for the checkpoint from the checkpoint memory;

retrieving the information corresponding to the status of the register freelist for the checkpoint from the checkpoint register; and using the register file unit validity bits and the information corresponding to the status of the register freelist to restore the particular association of logical registers to physical registers.

11. The register management unit of claim 8, wherein the control unit includes routines for implementing a backstep procedure to restore an intermediate association of logical registers to physical registers, the backstep procedure comprising:

determining the issue sequence number of the selected instruction;

using the issue sequence number to retrieve the association of the referenced logical register with the second physical register from the register reclaim unit;

updating the register file unit to clear a validity bit corresponding to the association of the referenced logical register with the first physical register;

storing the association of the referenced logical register with the second physical register in the register file unit; and setting a validity bit corresponding to the association of the referenced logical register with the second physical register.

* * * * *